(12) United States Patent
Parson

(10) Patent No.: US 9,337,631 B2
(45) Date of Patent: May 10, 2016

(54) ILLUMINATED CABLE PULLING AND RETRIEVAL DEVICE

(71) Applicant: Charles Ryan Parson, Orlando, FL (US)

(72) Inventor: Charles Ryan Parson, Orlando, FL (US)

( * ) Notice: Subject to any disclaimer, the term of this patent is extended or adjusted under 35 U.S.C. 154(b) by 0 days.

(21) Appl. No.: 14/322,191

(22) Filed: Jul. 2, 2014

(65) Prior Publication Data

US 2015/0016096 A1    Jan. 15, 2015

Related U.S. Application Data

(60) Provisional application No. 61/957,577, filed on Jul. 8, 2013.

(51) Int. Cl.
| | |
|---|---|
| *B25B 23/18* | (2006.01) |
| *H02G 1/08* | (2006.01) |
| *F21V 33/00* | (2006.01) |
| *B25F 5/02* | (2006.01) |
| *A45B 3/02* | (2006.01) |
| *F21Y 101/02* | (2006.01) |

(52) U.S. Cl.
CPC *H02G 1/081* (2013.01); *A45B 3/02* (2013.01); *B25F 5/02* (2013.01); *F21V 33/0084* (2013.01); *F21Y 2101/02* (2013.01)

(58) Field of Classification Search
CPC ...... H02G 1/081; F21V 33/0084; A45B 3/02; B25G 1/046; B25F 5/02
USPC .......................... 362/577, 578, 102, 119, 120
See application file for complete search history.

(56) References Cited

U.S. PATENT DOCUMENTS

| | | | |
|---|---|---|---|
| 4,819,141 A | 4/1989 | Maglica et al. | |
| 5,980,077 A * | 11/1999 | Shiao | 362/578 |
| 7,195,371 B2 * | 3/2007 | Thuma et al. | 362/199 |
| 8,118,463 B2 * | 2/2012 | Owen et al. | 362/577 |
| 8,162,363 B2 * | 4/2012 | Wang | 294/65.5 |
| 2002/0145866 A1 * | 10/2002 | Chen | 362/120 |
| 2005/0025599 A1 * | 2/2005 | Kopras et al. | 409/182 |
| 2006/0104085 A1 * | 5/2006 | Walker et al. | 362/578 |
| 2014/0036482 A1 * | 2/2014 | Vanko et al. | 362/119 |

* cited by examiner

*Primary Examiner* — Peggy Neils
(74) *Attorney, Agent, or Firm* — Jason T. Daniel, Esq.; Daniel Law Offices, P.A.

(57) ABSTRACT

A cable pulling and retrieval device includes an elongated generally hollow and transparent wand that is interposed between a handle and a hole saw. The handle includes a generally hollow portion for receiving and storing one or more batteries, and also houses a light producing device that generates a focused beam of light and directs the same into the wand. A cable attachment unit is secured to the base end of the handle, and one or more generally resilient arms extend diagonally from the wand.

8 Claims, 7 Drawing Sheets

ILLUMINATED CABLE PULLING AND RETRIEVAL DEVICE

CROSS-REFERENCE TO RELATED APPLICATIONS

This application claims the benefit of U.S. Application Ser. No. 61/957,577 filed on 7 Jul. 2013, the contents of which are incorporated herein by reference.

TECHNICAL FIELD

The present invention relates generally to tools for installing cables and other such devices within buildings, and more particularly to an illuminated cable pulling device.

BACKGROUND

The statements in this section merely provide background information related to the present disclosure and may not constitute prior art.

A task often encountered by electrical contractors, telephone workers and cable television installers, is to run physical cables from one location to another within a building structure. Whether it is an office building with suspended ceilings, or a home with fixed ceilings, the process typically requires two workers, wherein the first worker would cut an opening in the ceiling, and thread the cable through the opening and upwards into the attic space. Once positioned within the attic, the second worker must then attempt to locate the end of the cable through verbal guidance from the first worker. However, it is not uncommon for the cable to become buried in attic insulation and other such items, making the process of locating and retrieving it a difficult and time consuming endeavor.

Moreover, even when the cable is able to be positioned through the ceiling and insulation, it is extremely common for one of the workers to temporarily lose their grip on the cable itself, resulting in the cable falling back out of the ceiling and onto the floor, wherein the entire process must be started again.

Accordingly, there remains a need for a device capable of allowing a single user to quickly and easily position a cable or other such device within an attic space and to identify and retrieve the same in a manner that does not suffer from the drawbacks of the above noted process.

SUMMARY OF THE INVENTION

The present invention is directed to a cable pulling and retrieval device. One embodiment of the present invention can include an elongated generally hollow and transparent wand that is interposed between a handle and a hole saw. The handle can include a generally hollow portion for receiving and storing one or more batteries, and can further include a light producing device that can generate a focused beam of light and to direct the same into the wand.

In another embodiment, the hole saw can include a plurality of saw tooth ridges that can cut through a material such as drywall, and the handle can include a cable attachment unit which can be removably secured to a cable. Additionally, the device can further include one or more generally resilient arms which can transition between an extended and retracted state.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Figure 1:
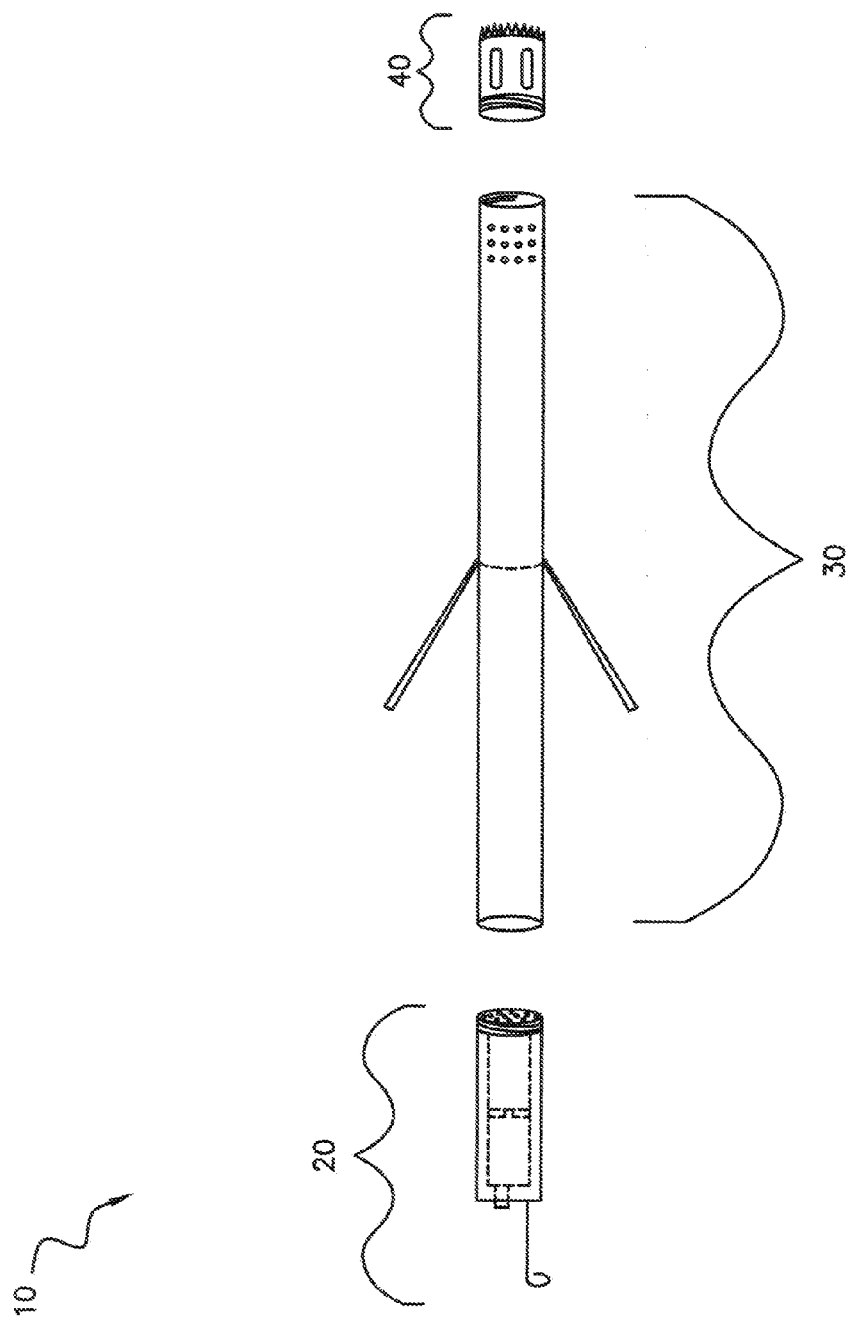
FIG. 1 is an exploded parts view of a cable pulling and retrieval device that is useful for understanding the inventive concepts disclosed herein.

Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As described herein, the term "removably secured," and derivatives thereof shall be used to describe a situation wherein two or more objects are joined together in a non-permanent manner so as to allow the same objects to be repeatedly joined and separated.

FIGS. 1-7 illustrate one embodiment of an illuminated cable pulling and retrieval device 10 that is useful for understanding the inventive concepts disclosed herein. As shown best in FIG. 1, the device can include, essentially, a light producing handle 20 that is connected to a generally transparent wand 30 and a hole saw 40.

Figure 2:
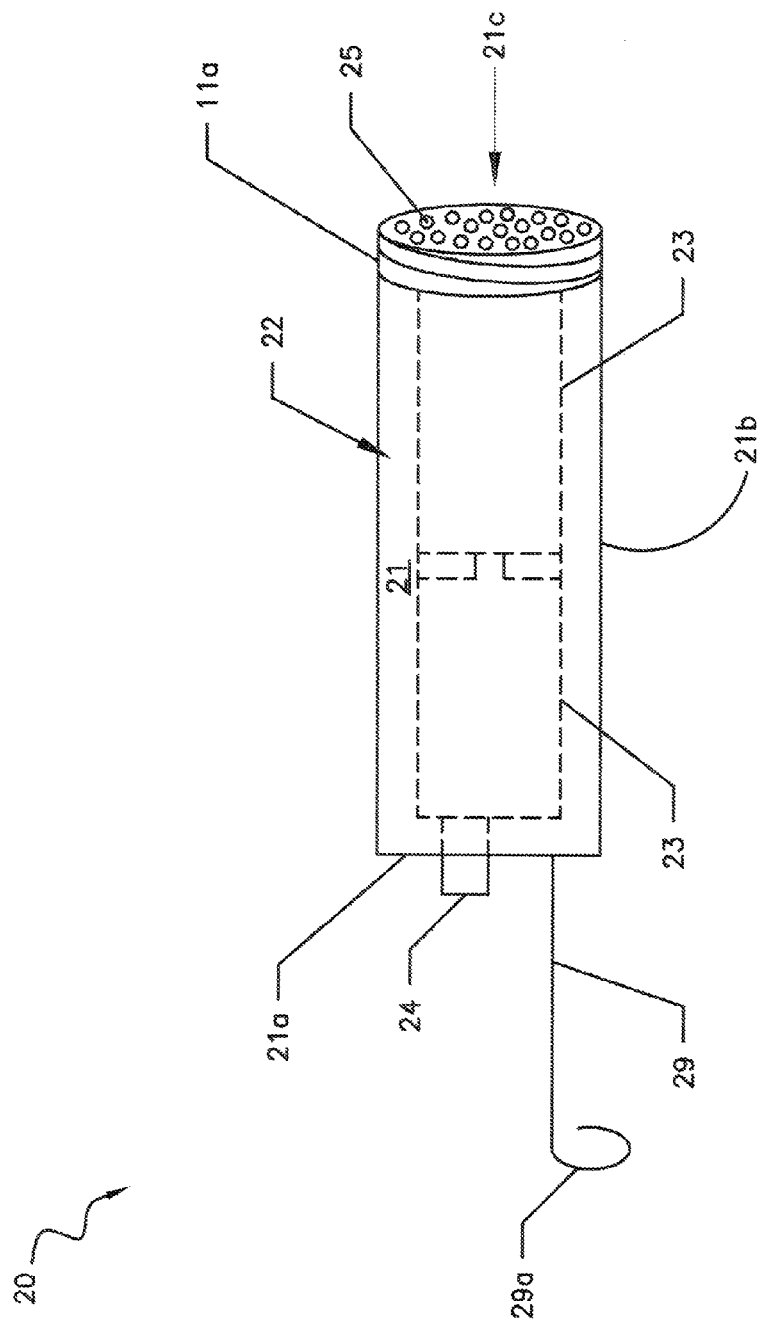
FIG. 2 is a side view of the handle of the cable pulling and retrieval device, in accordance with one embodiment of the invention.

FIG. 2 illustrates one embodiment of a device handle 20 that includes an elongated, generally tubular main body 21 having a base end 21a, a middle section 21b, and a wand attachment end 21c, that define a generally hollow interior space 22 for receiving a power source such a battery 23, for example. In one embodiment, the handle 20 can further include a control switch 24 and a light producing device 25 which can function to direct a beam of light into the transparent wand 30 described below. In this regard, the control switch can work in conjunction with an inserted power source, in order to transition the light producing device 25 between an illuminated state and a non-illuminated state.

As described herein, the light producing device 25 can include any number of different components which alone, or in combination function to generate light in any number of different colors, spectrums and intensities. For example, the light producing device can include one or more LED or incandescent light bulbs and a reflector, for example, which can function to generate a focused beam of light. Light producing devices and their associated components are well known in the art and include U.S. Pat. No. 4,819,141, the contents of which are incorporated herein by reference.

Although illustrated above as being fully contained within the handle portion 20, other embodiments of light producing devices are contemplated, wherein a portion of the same are positionable within the transparent wand. For example, in another embodiment (not illustrated) the light producing device can further include an elongated strand of LED lights that are disposed along the length of the wand 30.

In one embodiment, the handle 20 can further include a cable attachment unit 29 that extends from the base end 22 of the handle 20. In one embodiment, the cable attachment unit 29 can be constructed from an elongated, generally malleable wire having a hook, loop or other such connector 29a at a distal end. In operation, the connector 29a can be removably secured to a wire/cable that is being installed by the device.

Although described above as including a particular construction material and attachment location onto the handle, this is for illustrative purposes only, as the cable attachment unit 29 can include any number of different shapes, sizes, construction materials and connectors which can function to mate with a cable or wire in a nonpermanent manner.

Figure 3:
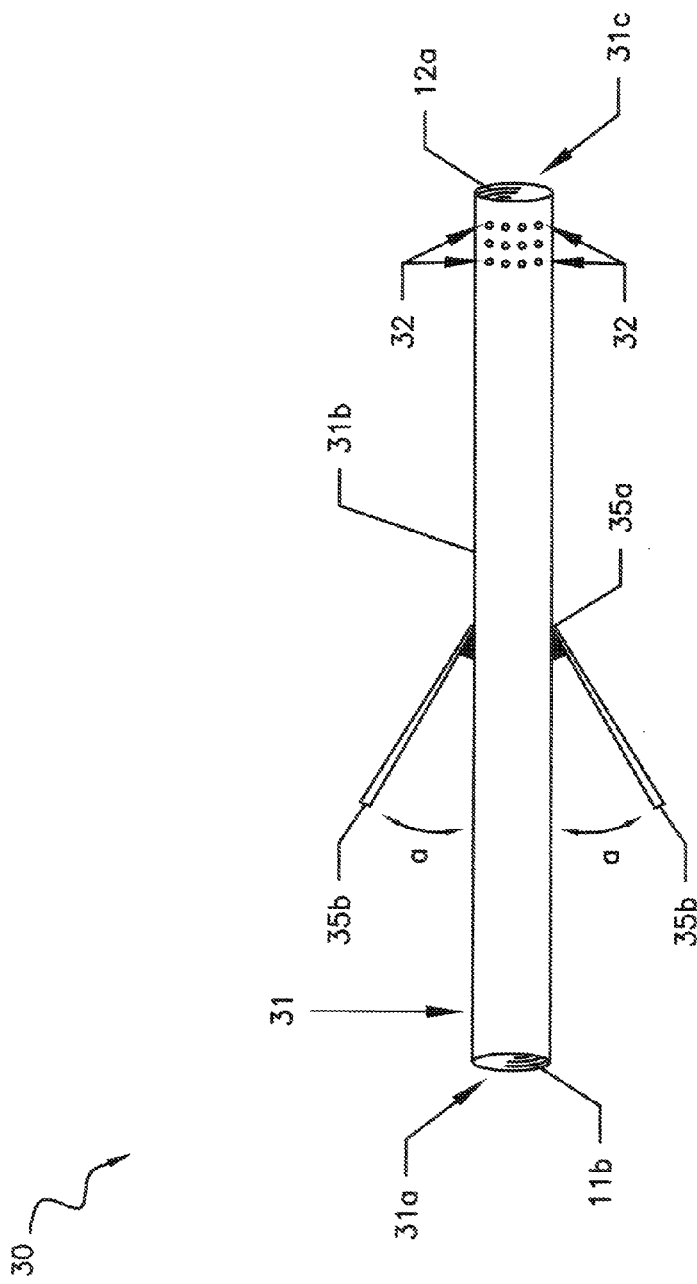
FIG. 3 is a side view of the wand of the cable pulling and retrieval device, in accordance with one embodiment of the invention.

FIG. 3 illustrates one embodiment of the central wand 30. As shown, the central wand 30 can include an elongated, generally tubular main body 31 having a handle attachment end 31a, a middle portion 31b and a saw attachment end 31c that define a generally hollow interior space. The main body can preferably be constructed from an impact resistant and generally transparent material such as clear plastic, for example, which can receive light from the light producing device 25 of the handle 20, and distribute the same along the length of the wand.

In one embodiment, a plurality of apertures 32 can be disposed along the main body 31 at a location that is adjacent to the saw attachment end 31c. Each of these apertures can function to deflect a portion of the supplied light away from the device, in order to increase the visibility of the device when the same is used within an attic or other dark location.

In another embodiment, the wand can also include a plurality of generally resilient arms which can extend diagonally from the main body 31. As shown, each of the arms can include a first end 35a that is in communication with the middle portion 31b of the main body, and a second end 35b which can bend or otherwise flex inward (see arrows a) when a force is applied thereon. In this regard, when the arms are in a diagonal position they are in an extended state, and when the arms are flush with the side of the main body 31, they are in a retracted state.

As described herein, each of the arms can be constructed from any number of resilient materials such as plastic and/or lightweight resilient metal wires such as steel and aluminum, for example, and can be secured onto the main body in accordance with known manufacturing techniques. In another embodiment, (See FIG. 1) the arms 35 can be constructed from a single piece of steel cable having a generally U-shape, wherein the central portion of the cable traverses the main body of the wand.

Figure 4:
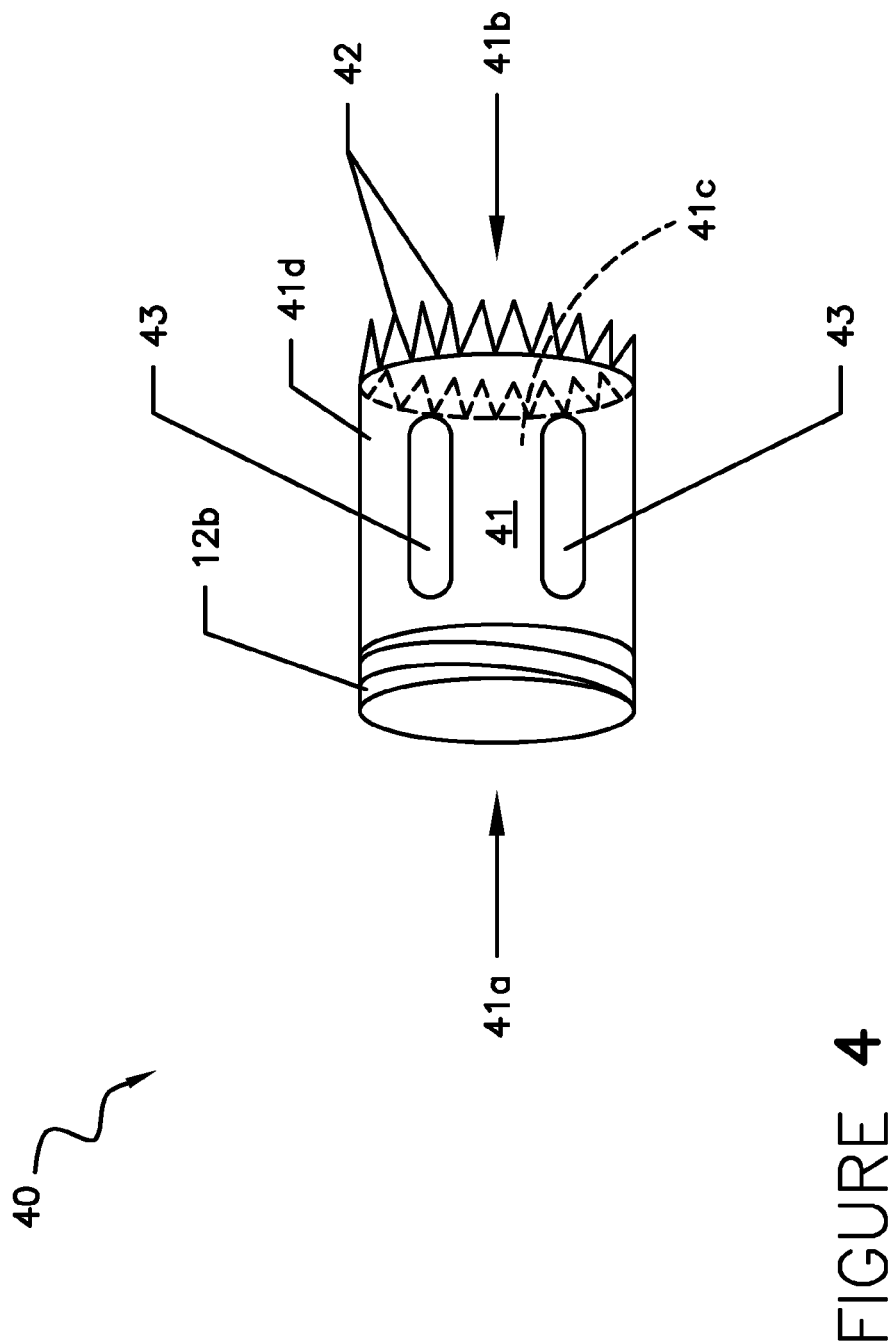
FIG. 4 is a side view of the hole saw of the cable pulling and retrieval device, in accordance with one embodiment of the invention.

FIG. 4 illustrates one embodiment of the hole saw 40. As shown, the saw can include a generally circular main body 41 having a wand attachment end 41a, a distal end 41b, an inside facing surface 41c, and an outside facing surface 41d. In one embodiment, the distal end 41b can include a plurality of saw tooth ridges 42 that are disposed thereon. In another embodiment, the main body 41 can further include one or more apertures 43 extending from the outside facing surface to the inside facing surface. Such apertures being useful for clearing and preventing debris from accumulating within the saw during device operation.

In one preferred embodiment, the hole saw 40 can be constructed from hardened steel, however, any number of other sturdy materials such as aluminum, plastic and PVC, for example, that are capable of cutting through drywall, insulation, and other such building materials, are also contemplated.

As described herein, the wand 30 can be secured to one or both of the handle 20 and the saw 30 in a removable manner, so as to allow a user to utilize any number of different sized hole saws 40 with the same wand 30 and handle 40; or to utilize any number of different handles 20 with the same wand 30 and hole saw 40. In the preferred embodiment, a plurality of embedded elements 11a can be located along the wand attachment end 21c of the handle 20, and a plurality of complementary threads 11b can be secured along the handle attachment end 31a of the wand 30 Likewise, a plurality of embedded elements 12a can be located along the saw attachment end 31c of the wand 30, and a plurality of complementary threads 12b can be secured along the wand attachment end 41a of the saw 40. Threaded elements having lands and grooves for securing complementary objects together via a twisting motion are extremely well known. Accordingly, no further description will be provided.

Although described above as utilizing threaded elements 30a-30b, and 31a-31b, capable of creating a secure attachment point between two objects when a rotational force is applied thereto, this is for illustrative purposes only, as any number of known connectors and components capable of creating a removable seal between two items can also be utilized. Moreover, alternate embodiments of the device are also contemplated wherein the wand 30 can be secured to each of the handle 20 and the saw 40 in a permanent manner, and in accordance with known construction methodologies which may utilize materials such as glue, resin, and/or hardware such as screws and bolts, for example.

While the dimensions of the elements are not critical, in the preferred embodiment the handle 20 can include an outside diameter of approximately 1 inch, and a length (distance between ends 21a and 21c) of approximately 3 inches. The wand 30 can preferably include an outside diameter of approximately 1 inch, and a length (distance between ends 31a and 31c) of approximately 18 inches, and the saw 40 can include an outside diameter of approximately 1 inch, and a length (distance between ends 41a and 41b) of approximately 2 inches.

Of course, the invention is not to be construed as limiting to any particular construction materials or dimensions. As such, those of skill in the art will recognize that the device can include any number of different dimensions suitable for cutting openings of any desirable amount (e.g., 1", 1.5", 1.75", 2", 5", 10", etc.,).

Figure 5:
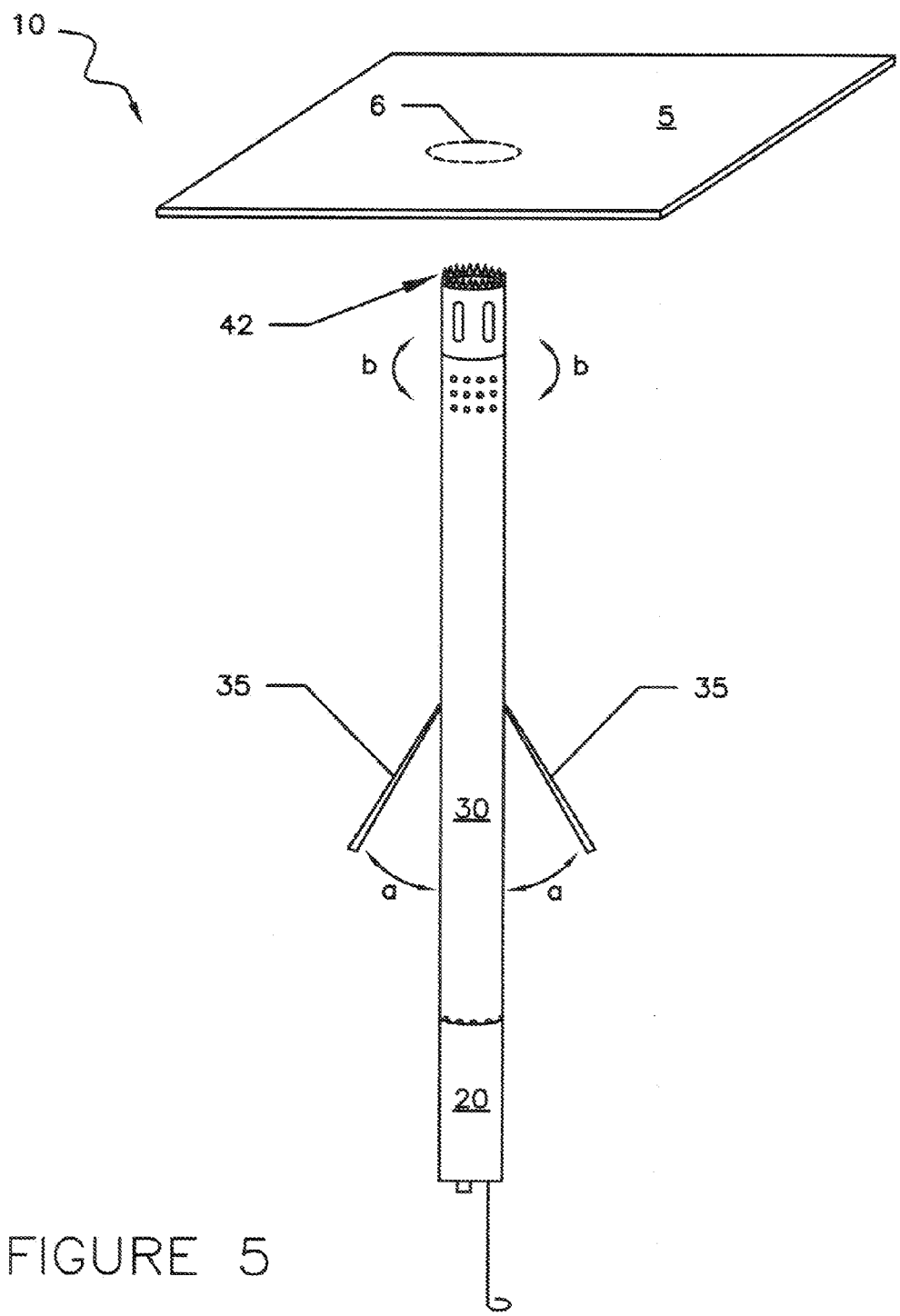
FIG. 5 is a perspective view of the cable pulling and retrieval device in operation, in accordance with one embodiment of the invention.
Figure 6:
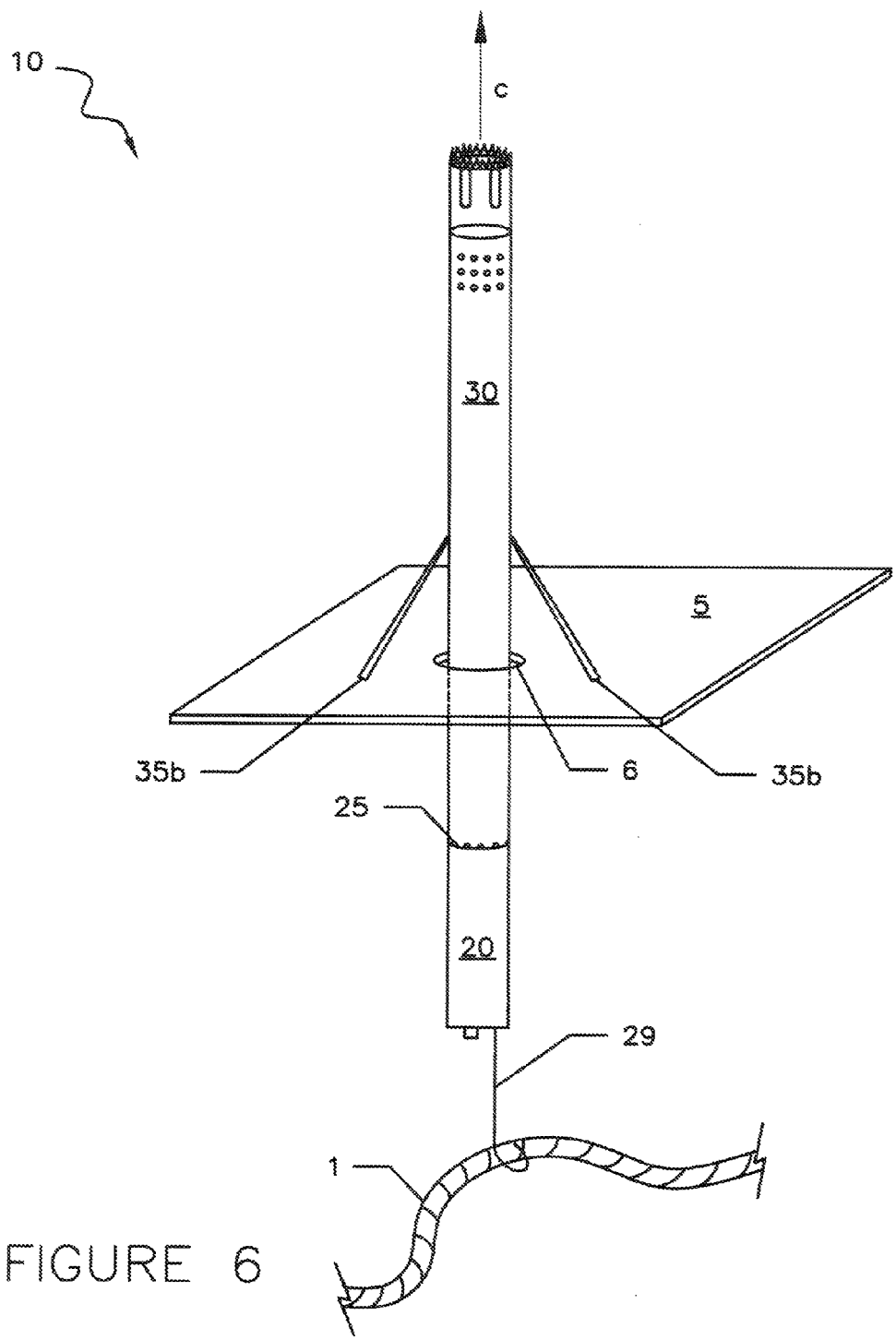
FIG. 6 is another perspective view of the cable pulling and retrieval device in operation, in accordance with one embodiment of the invention.

FIGS. 5 and 6 illustrate one embodiment of the device 10 in operation. As shown, the end of the saw can be positioned against a piece of material 5, such as a ceiling panel, or drywall, for example, that is desired to be cut. Next, a user can impart a twisting motion (see arrow b) in order to allow the saw tooth edges 42 to cut an opening 6 through the material 5.

Once the opening has been created, the saw 40 and wand 30 can be inserted through the opening 6 (see arrow c), and the flexible arms 35 can bend/retract inward towards the main body (see arrow a) until the bottom end of the arms have passed through the opening. Once the arms have passed through the opening 6, the arms can extend outward, wherein the bottom ends 35b can make contact with the upper surface of the material 5 in order to prevent the device from passing back through the opening.

Next, the user can attach a cable 1 or other such device onto the attachment unit 29, and can activate the light producing device 25. Once activated, the light producing device 25 can illuminate the wand 30 in order to allow the user to quickly and easily identify the location of the device from the attic. At that time, a user can retrieve the device 10 and the cable 1 to which the device is attached.

Figure 7:
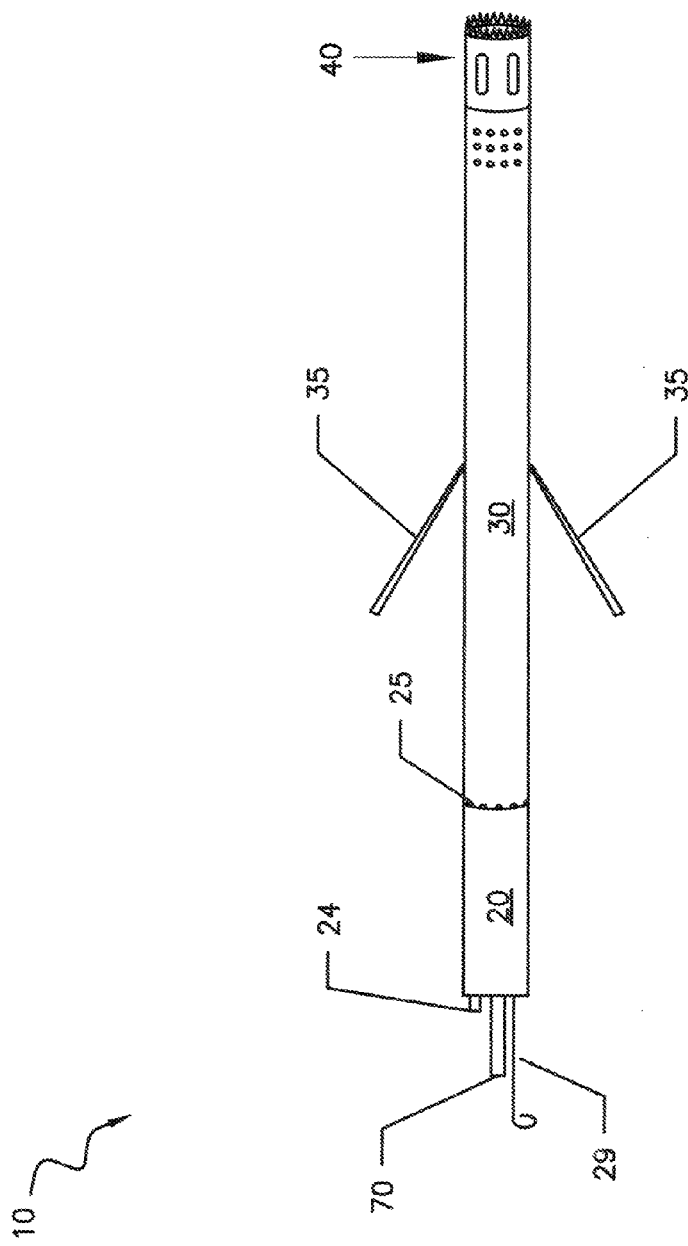
FIG. 7 is a side view of the cable pulling and retrieval device, in accordance with another embodiment of the invention.

FIG. 7 illustrates another embodiment of the device 10 wherein the base end of the handle 21a further includes a drill attachment protrusion 70 that extends linearly from a center portion of the handle 20. In the preferred embodiment, the drill protrusion 70 can be constructed from a single piece of hardened steel and can include a generally cylindrical or rectangular shape which can be engaged by the jaws of a conventional power drill. Such a feature can function to allow the device 10 to be secured to a power drill in order to impart the above described rotational force (arrow c in FIG. 5) onto a material 5.

Although illustrated as protruding from the bottom of the handle, other embodiments are also contemplated wherein the bottom of the handle itself forms the drill protrusion.

As described herein, one or more elements of the illuminated cable pulling and retrieval device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individual elements may be formed together as one continuous element, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A cable pulling and retrieval device, comprising:
an elongated generally hollow transparent wand having a first end, a second end, and an exterior surface having one or more generally resilient arms extending from the exterior surface of the transparent wand, each of said one or more arms being configured to transition between an extended state and a retracted state, wherein the arm remains in contact with the exterior surface of the transparent wand in the retracted state;
a handle having a first end that is in communication with the first end of the wand, and a second end that is not in communication with the wand;
a light producing device that is in communication with the handle, said device being configured to generate a focused beam of light and to direct the same into the wand; and
a hole saw having a first end that that is in communication with the second end of the wand, and a second end that is not in communication with the wand.

2. The device of claim 1, further comprising:
a cable attachment unit that is in communication with the second end of the handle.

3. The device of claim 1, further comprising:
a control switch that is positioned along the handle, said switch being configured to transition the light producing device between an illuminated state and a non-illuminated state, and
wherein the handle further includes a generally hollow space that is configured to receive and store at least one battery for powering the light producing device.

4. The device of claim 1, further comprising:
a plurality of apertures that are disposed along the wand, each of said apertures being configured to reflect a received beam of light away from the wand.

5. The device of claim 1, wherein each of the handle, the wand and the hole saw are secured together in a permanent manner.

6. The device of claim 1, wherein each of the handle, the wand and the hole saw are secured together in a removable manner.

7. The device of claim 1, wherein the light producing device includes at least one of an LED and an incandescent bulb.

8. The device of claim 1, further comprising:
a drill attachment protrusion that extends linearly outward from a center portion of the second end of the handle, said drill attachment protrusion being configured to engage a power drill in order to receive a rotating force.

* * * * *